United States Patent [19]

Cheever et al.

[11] 4,014,512
[45] Mar. 29, 1977

[54] TAMPERPROOF PLUG VALVE

[75] Inventors: Douglas L. Cheever, Dubuque; Faye L. Knodle, Newton, both of Iowa

[73] Assignee: A. Y. McDonald Mfg. Co., Dubuque, Iowa

[22] Filed: Aug. 23, 1976

[21] Appl. No.: 716,386

Related U.S. Application Data

[63] Continuation-in-part of Ser. No. 566,785, April 10, 1975, abandoned, which is a continuation-in-part of Ser. No. 475,447, June 3, 1974, abandoned.

[52] U.S. Cl. .............................. 251/309; 251/181; 85/36
[51] Int. Cl.² .......................................... F16K 5/16
[58] Field of Search ............... 251/181, 183, 309; 85/32, 36; 151/21 C

[56] References Cited

UNITED STATES PATENTS 2,678,801   5/1954   Bradbury ..................... 251/181

*Primary Examiner*—William R. Cline
*Assistant Examiner*—H. Jay Spiegel
*Attorney, Agent, or Firm*—Wegner, Stellman, McCord, Wiles & Wood

[57] ABSTRACT

A spring loaded, tamperproof plug valve such as a pressure gas stop has the rotatable valve plug resiliently retained against removal from the valve body by two stacked, slit, frustoconical, transversely arched spring washers that have teeth which make a one-way tight friction fit on a projecting end portion of the valve plug, and the outer peripheral portion of the forward of the two washers bears on a recessed planar area of the valve body which is surrounded by a continuous boss so a prying tool cannot be inserted beneath either washer. A self-threading sheet metal nut forms a thread in a reduced extremity of the valve plug and has a concentric integral skirt which bears on the teeth and also on the crown of the arched slit washer. The plug can be removed only by destroying the washer or the valve, either of which renders it inoperative. The nut will strip before the spring washers can be compressed enough to "lock" the plug in the valve body.

4 Claims, 5 Drawing Figures

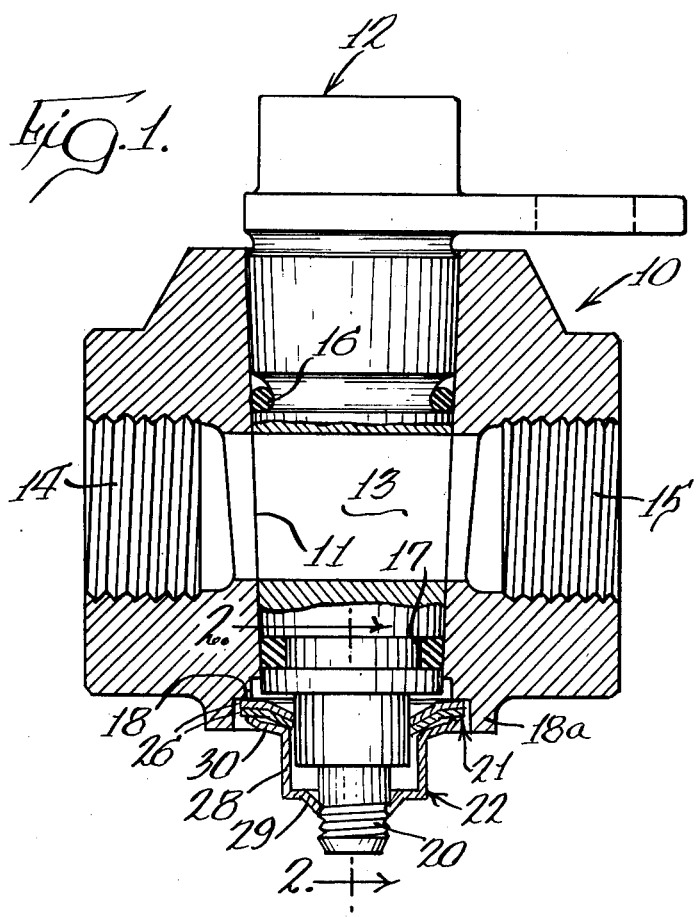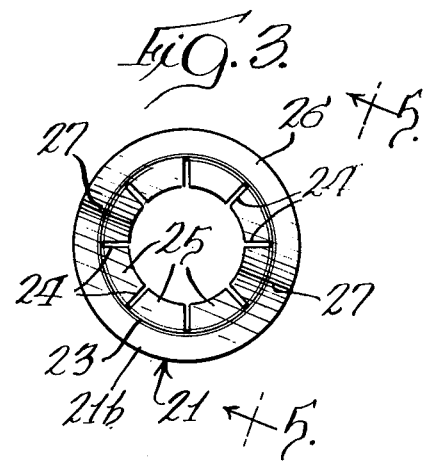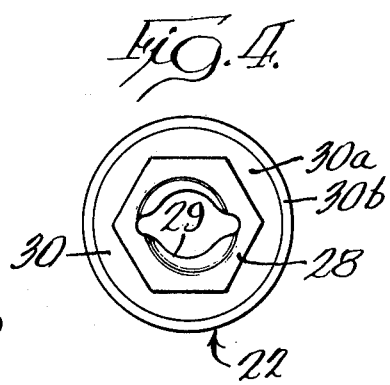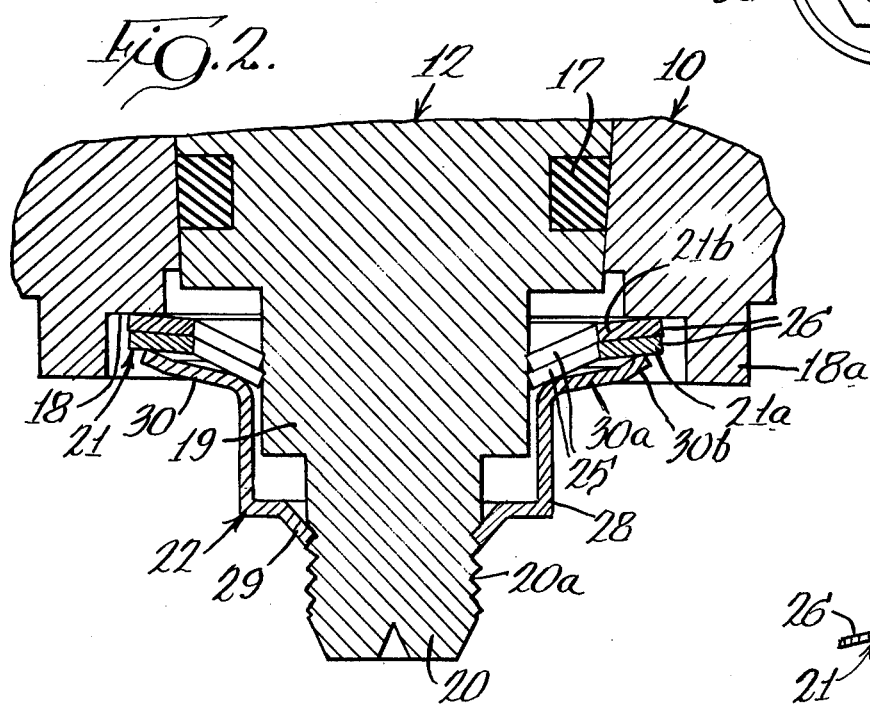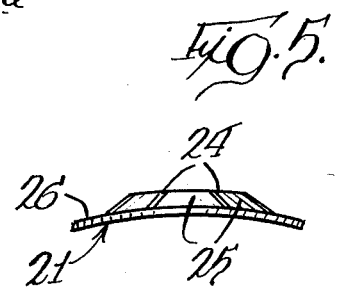

TAMPERPROOF PLUG VALVE

CROSS-REFERENCE TO RELATED APPLICATION

This application is a continuation in part of our copending U.S. patent application Ser. No. 566,785, filed Apr. 10, 1975 now abandoned; which in turn was a continuation in part of our U.S. patent application Ser. No. 475,477, filed June 3, 1974, now abandoned, with which it was copending.

BACKGROUND OF THE INVENTION

Plug valves which are used as gas stops and for certain other purposes must be so constructed that they cannot be disassembled and reassembled by any unauthorized person. Many arrangements have been developed to make tamperproof plug valves; and a typical structure is disclosed in Poisker U.S. Pat. No. 3,004,550, issued Oct. 17, 1961.

Most tamperproof gas stops, such as that of the Poisker patent, rely upon the use of some sort of locking arrangement that requires a special tool to release the valve plug for removal from the valve body. In most instances, the expedients used to make a plug valve tamperproof add substantially to its cost.

Accordingly, there has been a need for a very inexpensive means for rendering a plug valve tamperproof. In addition, most plug valves can have the assembly nut so heavily tightened in the field that the valve plug cannot be turned, even with a wrench. There has also been a need for a valve assembly which makes this impossible, so that even improper field adjustment cannot make the valve inoperable.

SUMMARY OF THE INVENTION

The principal object of the present invention is to provide a simple, inexpensive, and reliable tamperproof plug valve for use in applications where the valve will be cycled approximately 50 times in its lifetime.

Another object of the invention is to provide such a tamperproof plug valve which requires no special parts other than the valve body and the valve plug, so that all remaining parts are commercially avialable.

Yet another object of the invention is to provide such a tamperproof plug valve which, when used with a valve having a tapered bore and a tapered plug, permits tightening or loosening the plug in the body, within limits.

Still a further object of the invention is to provide a tamperproof plug valve that can be tightened in the field only to an extent which cannot render the valve unusable.

THE DRAWINGS

FIG. 1 is a transverse central sectional view of a plug valve embodying the invention;

FIG. 2 is a fragmentary transverse sectional view on a greatly enlarged scale, illustrating the lower end portion of the valve structure and showing the tamperproof means in detail;

FIG. 3 is a bottom plan view on an enlarged scale of one of the stacked pair of identical washers used in the assembly;

FIG. 4 is a bottom plan view of a self-threading nut and integral skirt which is used in the assembly; and FIG. 5 is a side elevational view of the washer of FIG. 3.

DETAILED DESCRIPTION OF THE INVENTION

Referring to FIG. 1, a valve embodying the present invention includes a valve body, indicated generally at 10, which has a tapered through bore 11 in which a tapered valve plug 12 is rotatably mounted in the customary way. A transverse bore 13 in the valve plug 12 provides communication between inlet and outlet passages 14 and 15 of the valve body in one position of the plug, and the plug blocks such communication when it is rotated 90°. O rings 16 and 17 are mounted in circumferential grooves above and below the plug bore 13 so as to prevent leakage of fluid around the valve plug.

The valve body 10 has a planar surface 18 which surrounds the smaller end of the through bore and is recessed by a surrounding annular boss 18a. The valve plug 12 has an end portion 19 that projects from the through bore beyond said planar surface 18 and boss 18a and has an extremity 20 of reduced diameter. The valve body 10 and the plug 12 are bronze, ASTM B584, containing a copper alloy No. 844.

Spring washer means, indicated generally at 21, consists of two identical spring washers 21a and 21b which are stacked and surround the projecting end portion 19 of the plug 12. A self-threading sheet metal nut, indicated generally at 22, is screwed onto the reduced extremity 20 in which it cuts a thread 20a; and bears upon the outer spring washer 21a. The spring washers and the nut are of spring steel, so the valve plug 12 is soft relative to the spring washers and the nut.

Referring now particularly to FIGS. 3 and 5, the spring washer 21b (with which 21 is identical) is seen to be generally frustoconical with an inner peripheral portion 23 having radial slits 24 to define teeth 25 which tightly grip the end portion 19 of the valve plug 12, while the outer periphery 26 of the spring washer 21b bears against the planar surface 18 of the valve body. In addition to being of generally frustoconical shape, the spring washer 21 is transversely arched to provide a crown 27 and a lower marginal portion 27a, which give it a resilience other than that afforded by the frustoconical shape and internal slits 24.

The nut means 22 is best seen in FIG. 4 to be fabricated from sheet metal so that it has a hexagonal wall 28 which is spaced slightly from the cylindrical surface of the valve plug end portion 19, and an inner periphery with self-threading teeth 29 which cut a thread 20a in the reduced extremity 20 of the valve plug as the nut is advanced on said extremity. A peripheral skirt 30 on the nut has a shoulder 30a which bears against the teeth 25 of the spring washer 21a and a rim 30b of the skirt bears upon the crown 27 of the transverse arch.

The valve is assembled by seating the valve plug 12 in the tapered bore 11 and then pushing the stacked spring washers 21a and 21b far enough onto the end portion 19 of the valve plug to assure that they are straight. The self-threading nut is then screwed onto the reduced end portion 20, cutting the thread 20a. Ultimately the shoulder 30a of the skirt bears upon the teeth 25 and the rim 30b of the skirt bears upon the crown of the transverse arch 27. The nut 22 pushes the washers 21a and 21b until the lower marginal portion 27a of the washer 21b bears upon the planar surface 18, after which continued tightening of the nut 22 causes the shoulder 30a of the skirt 30 to flex the teeth 25 of both washers and set them into the end portion 19; while generally at the same time the rim 30b of the skirt bearing upon the crown 27 of the spring washer 21a, flexes both spring washers to apply increased retaining force to the plug 12.

The specification for a commercial embodiment of the invention calls for a turning torque on the valve plug which is between one and four foot pounds. The nut 22 is tightened to tension the spring washer means 21 until the turning torque of the valve plug is in the range.

Engagement of the washer teeth 25 of the spring washers 21a and 21b with the end portion 19 of the valve plug 12 makes it effectively impossible to drive the plug 12 out of the valve body 10, because the teeth 25 dig into the end portion 19 of the valve plug. The boss 18a prevents a prying tool from being used to remove either of the washers so that they may be removed only by destroying them or the end portion of the valve plug. In either event, of course, the valve is rendered non-functional, so the valve assembly is completely tamperproof.

The spring washer means 21 alone is sufficient to maintain the valve in its assembled condition and prevent its disassembly, so the self-threading nut 22 can be removed without affecting valve operation; but the self-threading nut serves the dual function of permitting variable stress to be placed upon the washer means and of giving the assembled valve a finished appearance.

Even with the nut 22 removed, the washers 21a and 21b are so effective in holding the plug 12 in place that several blows of 35 in.-lbs. impact on the end of the plug will not deleteriously affect valve operation.

In a commercial embodiment of the invention, the self-threading nut 22 has a specification such that it will strip before sufficient torque is applied to lock the valve plug 12 in the tapered bore 11. Increasing spring tension makes it impossible for the teeth to advance along the extremity 20, so continuing rotation of the nut 22 cuts an annular groove in the extremity. This prevents the valve from being rendered inoperable by improper field adjustment of the nut, because even if the nut has been tightened to the stripping point and the plug is excessively difficult to turn, the condition can be remedied merely by tapping the lower end of the plug 12 sufficiently to seat the spring teeth 25 in the end portion 19 of the plug which relieves the spring tension enough to permit the plug to be turned.

The present tamperproof valve structure offers a substantial cost advantage against those previously known, because it eliminates cutting a thread on the valve plug, and also eliminates machining and plugging operations heretofore relied upon to provide a temperproof structure. In addition, assembly of the valve is simpler and requires less labor than does the assembly of previously known tamperproof valves.

Further, the spring washers 21a and 21b and self-threading nut 22 are commercially available components which can be purchased in quantity at very low cost. Suitable washers are an arched round PUSHNUT washer, PALNUT PA375012 having a spring force of about 60 to 80 lbs.; and a suitable self-threading nut is a PALNUT SD250011 which is capable of applying approximately 300 lbs. tension. Insofar as the inventors are aware, such washers and nuts are not commonly used together in an assembly where the nut is used to set the washer.

The foregoing detailed description is given for clearness of understanding only and no unnecessary limitations should be understood therefrom, as modifications will be obvious to those skilled in the art.

We claim:

1. A tamperproof plug valve comprising, in combination:

a valve body which has a through bore, a planar base surrounding one end of said through bore, and an uninterrupted annular boss surrounding said planar base so the latter is recessed;

a valve plug rotatable in the through bore, said valve plug having cylindrical end portion that projects from said one end of said through bore, and there being a cylindrical extremity of reduced diameter on said end portion;

a substantially annular spring steel washer surrounding said end portion, said washer having an inner peripheral portion provided with slits that define teeth which snugly engage the end portion and slide thereon as the washer is moved toward the valve body, and which bite into said end portion to effectively prevent reverse movement of said end portion through the washer, and said washer having an outer peripheral portion and being transversely arched so that it has a crown portion flanked by lower marginal portions which seat on said planar base of the valve body with the periphery of the washer so close to the annular boss as to preclude insertion of a prying tool beneath the washer;

and a hollow nut which is in the shape of a cup with a side wall in encircling, spaced relationship to the end portion of the valve plug, an opening in the bottom of the cup which has teeth engaging a thread formed in said cylindrical extremity, and a frustoconical skirt at the forward margin of the cup which has an internal shoulder bearing on the inner peripheral portion of the washer close to the inner ends of the washer teeth and a rim bearing on the crown of the washer, whereby said shoulder sets the washer teeth and said rim flexes the washer across said crown after the lower marginal portions of the washer seat on the planar base of the valve body.

2. The combination of claim 1 in which the valve plug is relatively soft metal, the nut is sheet metal which is substantially harder than said plug and has self-threading teeth, and the thread in the cylindrical extremity of the plug is formed by said self-threading teeth as the nut is advanced along said extremity.

3. The combination of claim 2 in which the spring rate of the spring washers, the rigidity of the self-threading teeth, and the hardness of the valve plug are so related that the nut stops advancing along the extremity of the valve plug before the washers can tighten the plug in the valve body to the point that it cannot be readily turned manually.

4. The combination of claim 1 which includes a second spring steel washer substantially indentical with and stacked upon said first named washer.

* * * * *